Figure 1:
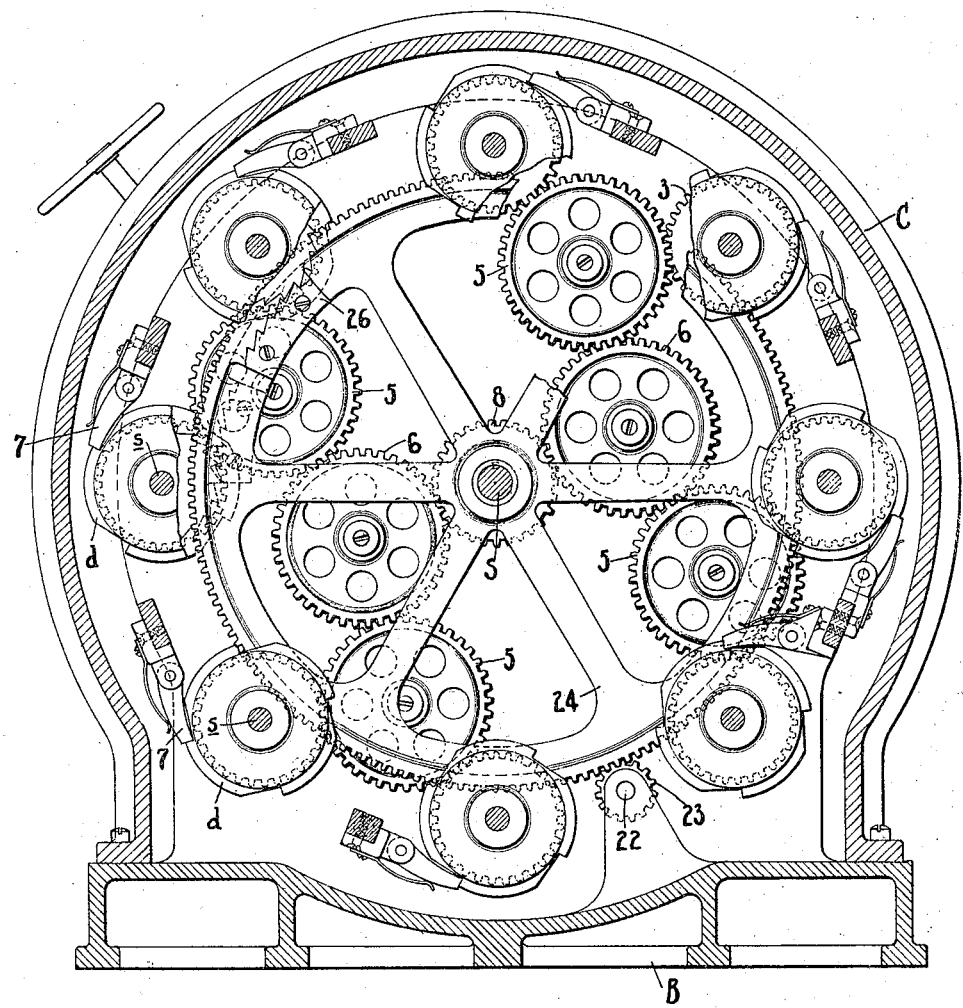

A. C. RUTZEN.
SPRING POWER MOTOR.
APPLICATION FILED JULY 6, 1914.

1,178,949.

Patented Apr. 11, 1916.
5 SHEETS—SHEET 1.

ATTEST

INVENTOR
A. C. RUTZEN
By Fisher & Moest ATT'YS.

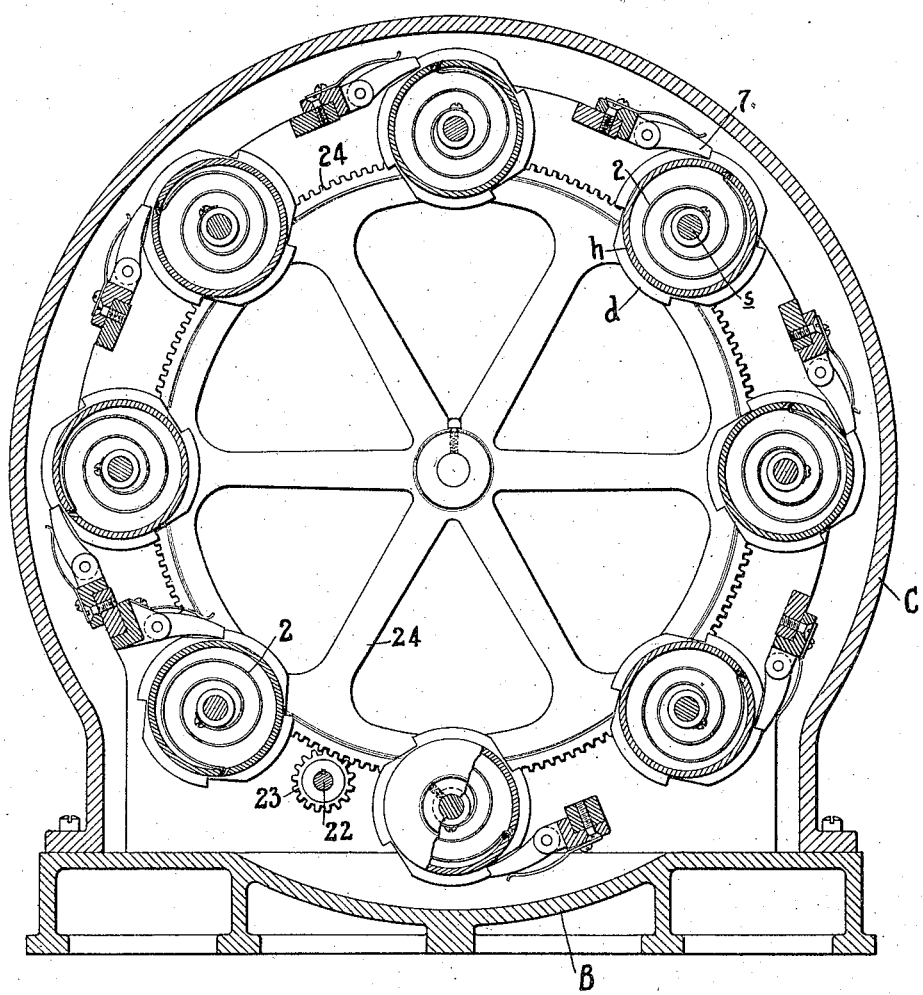

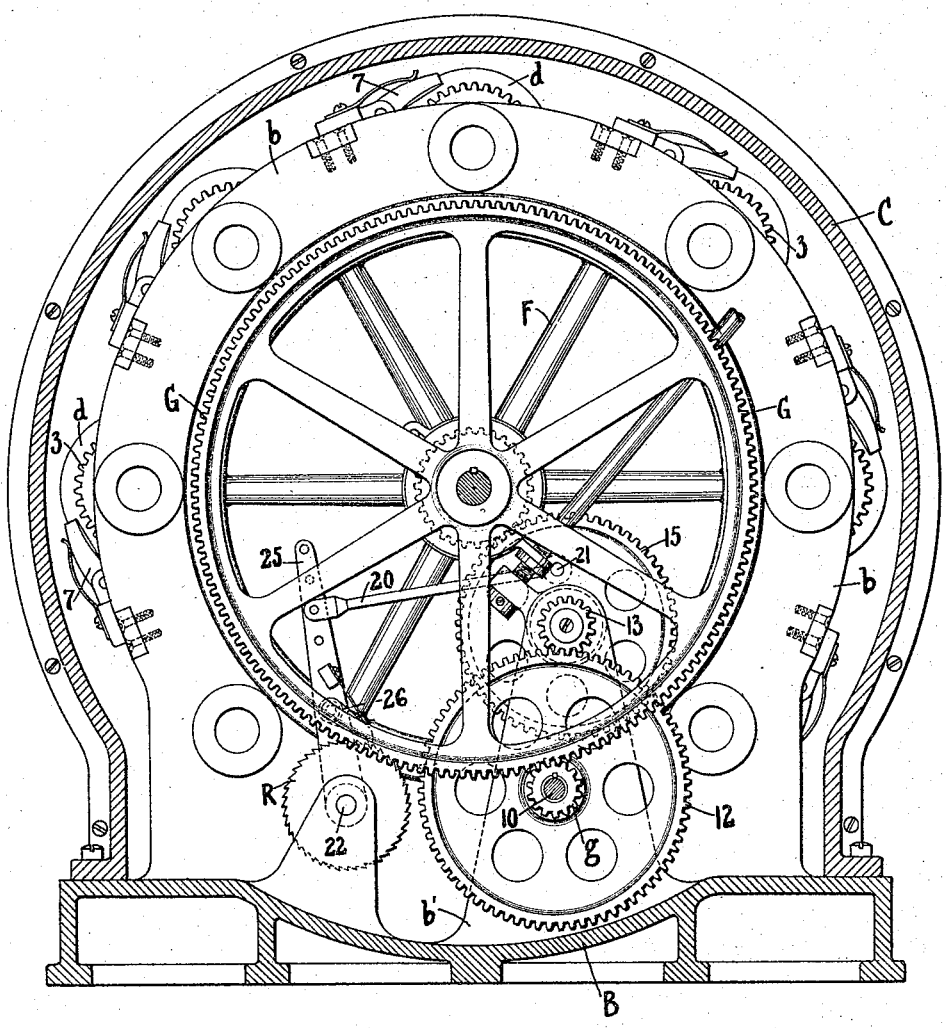

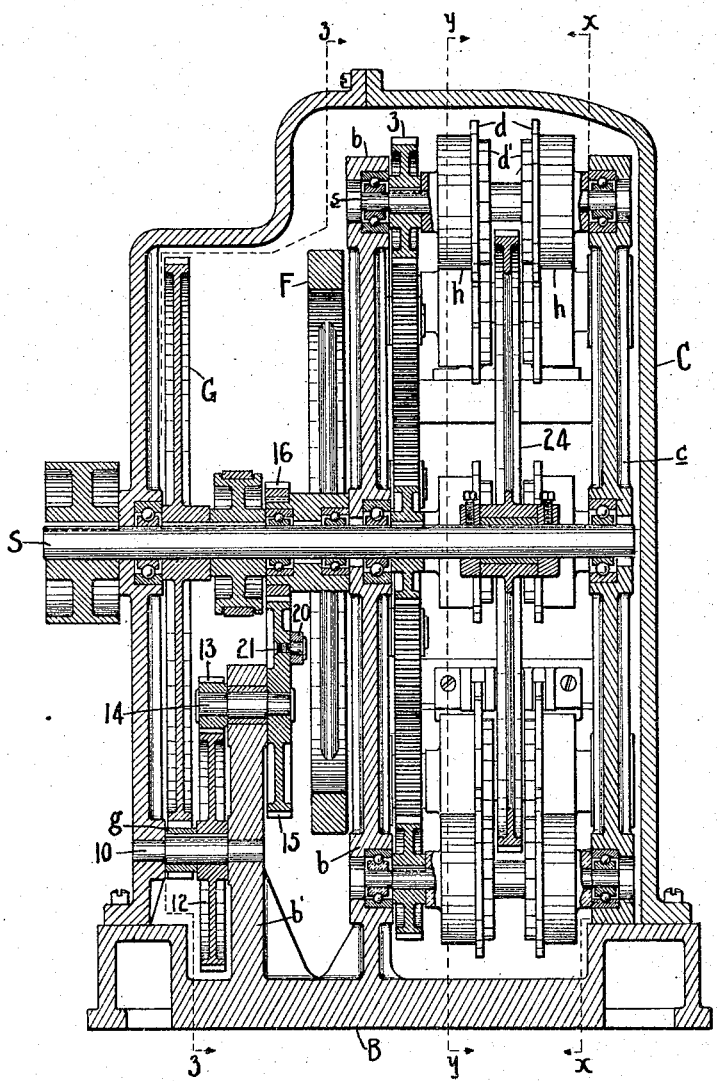

A. C. RUTZEN.
SPRING POWER MOTOR.
APPLICATION FILED JULY 6, 1914.
1,178,949.
Patented Apr. 11, 1916.
5 SHEETS—SHEET 5.
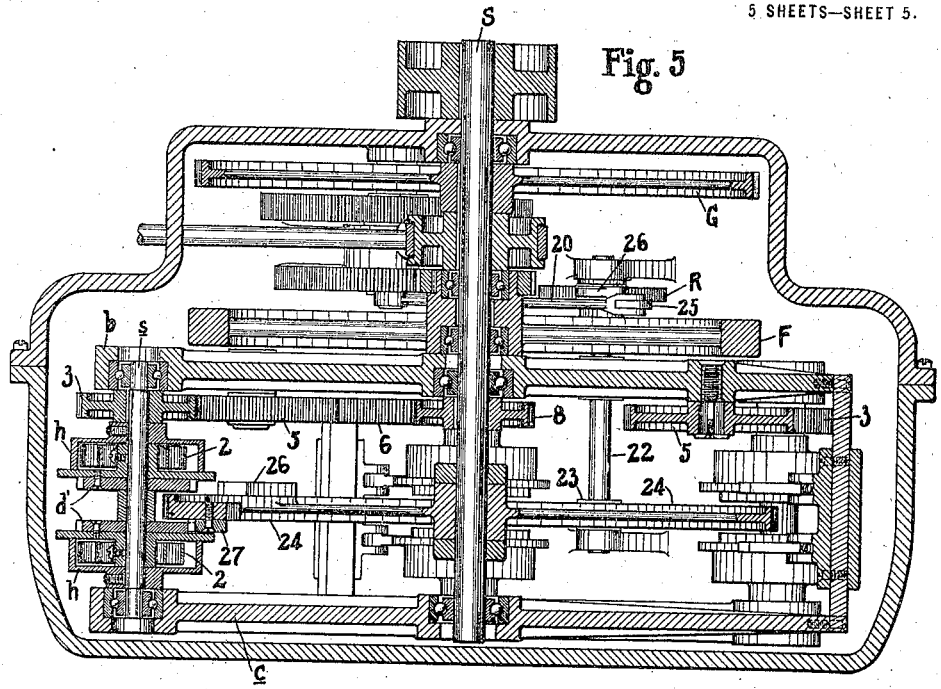
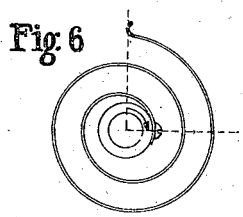
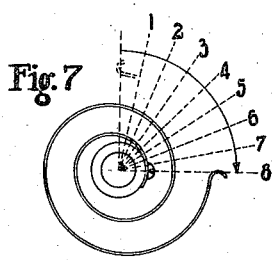
ATTEST
INVENTOR
A. C. RUTZEN
BY Fisher & Moore ATT'YS.

UNITED STATES PATENT OFFICE.

AUGUST C. RUTZEN, OF CLEVELAND, OHIO.

SPRING-POWER MOTOR.

1,178,949.      Specification of Letters Patent.     Patented Apr. 11, 1916.

Application filed July 6, 1914. Serial No. 849,231.

*To all whom it may concern:*

Be it known that I, AUGUST C. RUTZEN, a citizen of the United States, residing at Cleveland, in the county of Cuyahoga and State of Ohio, have invented certain new and useful Improvements in Spring-Power Motors, of which the following is a specification.

This invention relates to a spring power motor, and is an improvement in the type of motors set forth particularly in my two applications bearing Serial Nos. 809,851 and 815,546, respectively.

In the accompanying drawings Figure 1 is a sectional elevation of the motor or machine looking in to the left from a line corresponding substantially to $x$—$x$, Fig. 4. Fig. 2 is a sectional elevation on line $y$—$y$, Fig. 4, looking to the right. Fig. 3 is a sectional elevation on line 3—3, Fig. 4 looking inward. Fig. 4 is a central sectional elevation on the line of the main shaft, and Fig. 5 is a horizontal plan view on the line of the main shaft. Figs. 6 and 7 are details of the spring in different coiled conditions.

The complete casing or frame of the motor comprises not only the outer shell C and the base B on which it is erected but also the interior portions which help to carry the working parts and as indicated by $b$ and $b'$, shown as integral with the base B, and a separate standard or support $c$ bolted to the said base. The casing C is designed to provide a perfect closure for the contained mechanism, and it is desirable to make the inclosure dust proof.

S represents the power shaft, and the power is delivered thereto from the series of power springs 2, arranged in a circle about said shaft and geared to the shaft through a series of gear wheels 3, mounted upon the shafts $s$ which also carry the said spring in housing $h$ thereon and to which housing the said springs are attached at one end while the other ends are affixed to the hubs of the ratchet disks $d$ sleeved on the shafts $s$ and engaged by the pawls 7.

Eight different spring motor shafts $s$ and the complementary parts therewith as just described are provided in this machine and supported at their ends in anti-friction bearings in the portions $b$ and $c$ of the main frame, which also constitute supports for the shaft S. The said shafts $s$ are positioned in a circle about shaft S and parallel therewith, and each shaft $s$ carries two springs, 2, and associate parts, and the housings of said springs are fixed on the shafts $s$ while the ratchet disks $d$ are loose thereon and are adapted to be rotated to wind up the springs, as will presently appear. The gear 3 is splined on the inner end of shaft $s$ and operates through a transmitting gear 5, upon secondary gear or idler 6 and thence with pinion 8 on said central power shaft S. That is, the power developed by the springs is delivered from all said springs to shaft S through the gears 3, 5, 6, and 8, and the gears 5 are so disposed in the system that each one serves two sets of springs, while the idler or intermediate gear 6 transmits the power from four sets of springs or eight springs altogether to the shaft S. This concentrates the delivery of the spring power upon opposite sides of the pinion 8, and the only weakness of this arrangement is the danger of stripping the cogs on said pinion. If this danger should become serious it can be overcome by increasing the number of idlers 6 from two to four.

The re-winding of the springs is mechanical and automatic and proceeds from spring to spring successively in rotation, as will presently appear. Thus, a master gear G is fixed on shaft S and meshes with a pinion $g$ on a short shaft 10 carrying a gear wheel 12 on its other end. The said gear wheel meshes with a pinion 13 on shaft 14 supported on standard $b'$ and having a gear wheel 15 mounted on the inner end thereof.

F represents a fly wheel having a hub loosely mounted on shaft S and carrying a pinion 16 in mesh with gear 15.

The foregoing mechanism runs continually while the machine is in operation and is geared up to the fly wheel or balance wheel in order that the momentum of said wheel may be utilized to the utmost extent possible for re-winding the springs, and the expenditure of energy in shaft S for this purpose kept down to the minimum. In this connection it will be noticed that the fly wheel is run on anti-friction bearings on shaft S and is not directly connected with said shaft. It will also be noticed that operative connection of the said wheel with said shaft is only indirect and remote through a number of gears and shafts which at last reach back to the master gear G, and that the actual re-winding mechanism enters into these gear connections at the gear 15 which is next to the fly wheel by its pinion 16. This brings the re-winding as near as possible to the momentum of said fly wheel and as remote as possible from the shaft S. The said re-winding mechanism after leaving said gears, begins with a connecting rod 20 engaged on an eccentrically disposed crank pin 21 on gear wheel 15 and which in a sense converts the said wheel into a crank wheel; a ratchet wheel R mounted on a shaft 22 which runs back to the rear portion of the machine and carries a pinion 23 meshing with the re-winding gear 24, Figs. 1 and 5, and a lever or arm 25 mounted to oscillate on shaft 22 and having the outer end of connecting rod 20 connected therewith. Said lever has a series of holes to adjust the position of the rod 20 thereon, according to the length of throw wanted for the time in the said lever and which throw determines the re-winding coil of the power springs. A pawl 26 on said lever engages the ratchet wheel R, and when the said lever is drawn forward the said wheel R and the shaft 22 are rotated correspondingly. This constitutes a positive forward movement during which the re-winding occurs. On the return stroke of said lever the parts are idle and thus an intermittent movement is provided for the said spring re-winding mechanism.

Rotation is imparted to shaft 22 through the said ratchet mechanism and lever 25, and a corresponding rotation is imparted to the re-winding wheel 24 through pinion 23 on said shaft. The said wheel has ratchet segments 26 and 27, respectively, on opposite sides and in successive relations, and these engage the ratchet or toothed disks $d'$ which are fixed upon the outside of the disks $d$, Fig. 5. Each power spring 2 has its own ratchet disks $d$ and $d'$, which rotate together when engaged by the ratchet segments on wheel 24, and the arrangement of said segments is such that first one spring on a given shaft $s$ is wound and then the other. For example, the primary ratchet mechanism R and lever 25 will cause the re-winding wheel 24 to rotate say the full length of one of its ratchet segments and then stop. This will wind up the power spring then under engagement. After a very brief interval the said wheel will be carried forward the length of another segment and the other spring on the same shaft will be re-wound. As this occurs the advance segment on the near side is carried forward into position to engage the ratchet disk next in order on the next succeeding shaft $s$ and wind the spring it controls, and so on from set to set of springs and continuously over and over again while the machine runs. The pawls 7 on disks $d$ catch and hold the tension of the re-winding.

Respecting the operation of the machine herein described, it should be understood that I do not claim that the machine will run perpetually, nor do I mean to fix any length of time that it will run, because much will depend on the kind and amount of work that is put upon it. However, I do claim that the machine will do useful work for a longer or shorter period, subject to conditions, and that by the kind of springs and their disposition in the machine and the re-winding mechanism substantially as described, the duration of operation is materially prolonged over what would be possible with the same springs without such re-winding mechanism.

What I claim is:

1. In spring motors, a series of coiled springs arranged in a circle and means to rewind said springs comprising a shaft and a wheel thereon adapted to be rotated uniform distances at predetermined intervals, a projection on said wheel, ratchet mechanism governing the rotation of said wheel and ratchet mechanism connected with each of said springs adapted to be engaged by said wheel successively.

2. In spring motors, a series of coiled springs arranged in pairs on a single shaft about a common center and each spring having a rewinding mechanism, a shaft and a wheel thereon adapted to engage said rewinding mechanism successively, and ratchet mechanism adapted to impart intermittent rotation to said shaft and wheel.

3. In spring motors, a series of coiled power springs disposed about a common center, mechanism to rewind the said springs including a shaft, a fly wheel and a ratchet mechanism actuated thereby and adapted to impart an intermittent rotation to the said shaft.

4. In spring motors, a series of coiled springs arranged in pairs in a circle, ratchets connected with each spring to re-wind the same, a wheel having projections on each side adapted to engage the ratchets in each pair successively and means to rotate said wheel intermittently.

5. The construction described comprising a shaft and a pair of power springs thereon, housings rotatable on said shaft having one end of said springs fixed on the hub thereof and a ratchet disk for each housing having the other end of said springs affixed thereto, actuating disks fixed on the sides of said ratchet disks respectively and a wheel having means on its sides constructed to engage and rotate said actuating disks in each pair of springs successively.

6. The construction described comprising a main shaft and a series of power springs in a circle about the same and in power connection therewith, in combination with a fly wheel rotatably mounted on said main shaft and intermittently operating means to rewind said springs operatively connected with said fly wheel.

7. The construction described comprising a main shaft and a series of power springs in a circle about the same and in power connection therewith, a fly wheel loosely mounted on said main shaft and a master gear fixed on said shaft, drive mechanism connecting said master gear operatively with said fly wheel, and means to rewind said springs operatively connected with said fly wheel and comprising a rewinding wheel adapted to come into rewinding relations intermittently.

8. In spring motors, a series of coiled springs concentrically arranged in pairs, a single shaft on which each pair of springs is separately rotatable, a ratchet mechanism on each spring and a wheel provided with segments to engage said ratchets and wind the springs, in combination with a ratchet controlled shaft and a pinion thereon engaging the said wheel, and means to rotate said shaft uniform distances at predetermined intervals, said means comprising a fly wheel in balancing relations therewith.

9. In spring motors a series of springs concentrically disposed in pairs and a central shaft, in combination with a series of gears to carry the power from said springs to said shaft comprising a gear for each pair of springs and a single gear on said shaft, an intermediate gear meshed by two of said spring gears and an idler meshed by said intermediate gears and in mesh with the gear on the said shaft, whereby eight different springs convey their energy to said shaft through a single point of contact with the gear thereon.

In testimony whereof I affix my signature in presence of two witnesses.

AUGUST C. RUTZEN.

Witnesses:
F. J. FREER,
R. B. MOSER.